Patented Dec. 28, 1948

2,457,775

UNITED STATES PATENT OFFICE 2,457,775

MANUFACTURE OF GLASS FIBERS

Paul Ebaugh, Cambridge, Mass., assignor to Owens-Corning Fiberglas Corporation, a corporation of Delaware No Drawing. Application October 27, 1943, Serial No. 508,091

8 Claims. (Cl. 49—77)

1

This invention relates to the manufacture of glass fibers, and particularly to the coating of fibers as a step in their production.

The invention concerns itself with the manufacture of fibers, and especially glass fibers, wherein a multiplicity of fine filaments are drawn from a supply body of fluid or molten material with sufficient speed to attenuate the material into substantially continuous fibers. The fibers thus produced are usually gathered at some suitable point in their path of travel to form a strand and the latter is ordinarily packaged by winding the same on a rotating drum. One such method of making glass fibers is disclosed in the Slayter and Thomas Patent No. 2,234,986 of March 18, 1941.

In carrying out the foregoing process, the fibers are normally advanced at a very high rate of speed and this, together with the fact that newly formed glass surfaces are highly abrasive, produces a condition which frequently causes one or more of the fibers to break during attenuation. In an effort to overcome this condition, a protective coating is applied to the fibers at some point, usually between the supply body and the winding station and preferably at the point of gathering of the fibers into a strand.

The selection of a coating which not only possesses the requisite protective characteristics but in addition is capable of "setting" on the fibers in the very short period of time required for the fibers to travel from the point of application of the coating material to the packaging station presents a problem of some magnitude. In fact, heretofore the rate of attenuation was often limited by the rate at which the coating material became effective. This difficulty is satisfactorily overcome by the invention.

It is one of the principal objects of this invention to provide a coating material that will surround the fibers to prevent their mutual abrasion and that will also be effective practically instantaneoulsy upon application to the fiber surfaces so as to be applicable to high speed attenuation. It is a further object to provide a resinous coating material that may be applied in solution for uniformly covering the fibers and that will be effective to protect the fibers before all or most of the solvent has evaporated.

It is another object of the invention to apply to the fibers immediately after they are attenuated, a coating substance in solution in a critical combination of solvents and non-solvents at slightly elevated temperature and that will protectively coat the individual fibers upon evaporation of a very small amount of the solvent or upon slight lowering of the temperature so that the coating material becomes effective almost instantaneously upon application.

As will be presently more fully described, the coating comprises a mixture containing a resin and a critical combination of a resin solvent or solvents with a resin non-solvent that is less volatile than the solvent. The proportions are so adjusted that upon slight evaporation of the solvent at the time of application of the solution to the fibers, the resin coagulates to substantially instantaneously protect the fiber surfaces.

As a further feature the proportion of the substances may be such that the resin is in solution only at slightly elevated temperatures and as the solution cools the evaporation of the solvent is aided in causing rapid coagulation of the resin. In this case the difference in volatilities is not so important so long as the non-solvent is not more volatile than the solvent.

If desired, a lubricant for the fibers may also be included in the mixture of resin and solvents. The lubricant may be incompatible with the resin so that it aids in preventing adjacent windings of the strand from sticking together on the spool or drum on which the strand is wound, subsequent removal of the strand being thus facilitated.

It will be apparent as this description proceeds that various combinations of resins, solvents and non-solvents may be used to accomplish the desired results. In general, however, at least one solvent and one non-solvent are employed, the non-solvent having a lower volatility than the solvent. The non-solvent is preferably miscible with the resin solvent to provide a stable solution.

One composition which has given particularly satisfactory results is a resin such as polystyrene dissolved in toluene and a resin non-solvent, such as Stoddard solvent, which is miscible with toluene. This mixture is desirably maintained at a temperature above ambient temperature (approximately 130° F. in the case of normal room temperatures), the amount of Stoddard solvent being sufficient to cause rapid coagulation of substantially all the resin at ambient temperatures. If desired, a small amount of mineral oil or vegetable oil may also be included in the mixture.

A number of different resins, solvents and non-solvents that may be used in different proportions to secure the desired results are given in the following examples of satisfactory coatings but others, of course, may be employed within the principle of the invention.

Example 1

| | Percent |
|---|---|
| Polystyrene | 2 |
| Mineral oil | 13 |
| Toluene | 50 |
| Stoddard solvent [1] | 35 |

[1] Stoddard solvent is, by the Bureau of Standards specifications, a petroleum distillate, clear and water-white, having a flash point not lower than 100° F. (by the "Tag" closed tester), and the distillation end point of which is less than 410° F.

In the event the mineral oil is omitted, the following example may be successfully used.

Example 2

| | Percent |
|---|---|
| Polystyrene | 15 |
| Equal parts of toluene and Stoddard solvent | 85 |

In Examples 1 and 2, the toluene is the resin solvent and the Stoddard solvent is the non-solvent.

If desired, a hydrocarbon solvent such as xylene may be added to the toluene to form the solvent for the resin. When this procedure is adopted the following mixture may be employed.

Example 3

| | Percent |
|---|---|
| Polystyrene | 13.3 |
| Toluene | 43.6 |
| Stoddard solvent | 35.4 |
| Xylene | 7.7 |

The above proportions may be varied to some extent but in any case the toluene-xylene component should be present in sufficient concentration to take the Stoddard solvent without precipitation of the resin.

The following example illustrates a mixture embodying a vinyl resin such as a polyvinyl chloride resin and a resin solvent selected from the ketone group.

Example 4

| | Percent |
|---|---|
| Koroseal (a polyvinyl chloride polymer) | 5–10 |
| Methyl ethyl ketone | 50–70 |
| Cyclohexanone | 20–40 |
| Stoddard solvent | 5–20 |

In connection with the above, it will be noted that the ketone and cyclohexanone mixture is the resin solvent. This mixture is present in sufficient proportion to take the Stoddard solvent, but coagulation of the resin will take place as soon as some of the highly volatile solvent mixture escapes from the solution.

Example 5

| | Percent |
|---|---|
| Ethocel (an ethyl cellulose resin) | 5–10 |
| Toluene | 15–30 |
| Stoddard solvent | 50–80 |
| Butanol | 2–10 |

The resin is readily soluble in the toluene-butanol mixture. The concentration of this solvent is high enough to enable adding the specified amount of Stoddard solvent without destroying the solution. However, as soon as the toluene-butanol concentration has decreased slightly, the ethyl cellulose resin coagulates.

Example 6

| | Percent |
|---|---|
| Neville R-3 resin (a coumarone-indene resin) | 5–10 |
| Mineral oil | 5–10 |
| Toluene | 10–20 |
| Stoddard solvent | 70–90 |

The following two examples are representative of mixtures employing rosin that have been found satisfactory as fiber coatings.

Example 7

| | Percent |
|---|---|
| Rosin | 5–10 |
| Stearic acid | 1–2 |
| Vegetable oil | 10–20 |
| Toluene | 10–20 |
| Stoddard solvent | 70–90 |

Example 8

| | Percent |
|---|---|
| Rosin | 5–10 |
| Stearic acid | 1–2 |
| Alcohol | 10–20 |
| Stoddard solvent | 70–90 |

The lubricant may be omitted from Examples 6 and 7 or may be included in Examples 3, 4, 5 and 8, depending on whether or not it is important to lubricate the fiber surfaces. In addition, it should be understood that the foregoing examples do not represent all of the possible coatings that may be employed to secure the desired results previously set forth but merely serve as embodiments of the invention. Nor are the proportions given critical since within the principle of the invention the relative amounts of resin, solvent and non-solvent may be varied to suit changed conditions. For instance, where it is desired to use the coating material for application at elevated temperatures to aid in rapid coagulation of the resin, it may be preferable to reduce the proportion of resin solvent, while if the material is applied at relatively low temperatures the resin solvent may have to be increased somewhat. The best proportions may be ascertained simply by visual inspection, the object being, of course, to employ as large a relative proportion of non-solvent as possible without causing coagulation of the resin prior to application to the fibers and consequent premature tendency of the coagulated resin to precipitate from the liquid vehicle.

In practice the coating material either at elevated or at normal room temperature, as desired, is fed from a reservoir to a pad or wick with which a plurality of the fibers being formed are in contact. The wick is ordinarily employed to group the fibers into a strand and is located intermediate the supply of molten glass and the attenuating means, in most cases a drum or spool which attenuates the molten glass and winds the attenuated fibers into a package thereon. The wick is spaced less than 15 feet from the drum or spool and attenuation of the fibers is at the rate of 10,000 to 15,000 feet per minute and as high as 20,000 feet per minute in some instances. Under these circumstances only a very small fraction of a second elapses from the time of application of the coating material to the time that the strand of fibers is wound onto the spool. The almost instantaneous coagulation of the resin and precipitation of the resin onto the fiber surfaces, due to evaporation of a small amount of the resin solvent and/or to the cooling of the coating material, provides a protective coating on the fiber surfaces in this small interval before the fibers reach the spool. In addition to protecting the fiber surfaces, the coagulated resin may also serve to aid in holding the fibers together into an integral strand.

Various modifications may be made within the spirit and scope of the appended claims.

I claim:

1. In the method of making glass fibers in which streams of molten glass are continuously flowed from a supply of molten material, the streams are continuously attenuated into fibers at lineal speeds at least as high as about 10,000 feet per minute, and the fibers are continuously collected into a wound package as they are attenuated, the step of applying to the fibers after they are formed but in advance of their collection into the package a fiber-coating material containing a resin and a combination of a solvent for the resin and a non-solvent for the resin, the non-solvent having a lower volatility than the solvent, the solvent and non-solvent being in such proportions that the resin will coagulate upon evaporation of at least a part of the resin solvent subsequent to application of the material to the fibers and prior to collection of the fibers with the attendant coagulation of the resin to protect the fiber surfaces.

2. In the method of making glass fibers in which streams of molten glass are continuously flowed from a supply of molten material, the streams are continuously attenuated into fibers at lineal speeds at least as high as about 10,000 feet per minute, and the fibers are continuously collected into a wound package as they are attenuated, the step of applying to the fibers after they are formed but in advance of their collection into the package a fiber-coating material containing a resin and a combination of a solvent for the resin and a non-solvent for the resin, the non-solvent and the solvent being compatible, the proportions of solvent and non-solvent being such that the resin coagulates at normal operating temperature, and maintaining the material at elevated temperatures sufficient to maintain the resin in solution prior to application of the material to the fibers.

3. The method of claim 1 wherein the fiber-coating material comprises a resin, toluene, and Stoddard solvent, the resin being soluble in the toluene and insoluble in the Stoddard solvent and the proportions of toluene and Stoddard solvent being such that the resin will coagulate upon evaporation of at least a portion of the toluene component.

4. The method of claim 1 wherein the fiber-coating material comprises a styrene resin, an oleaginous lubricant for the fiber surfaces, and a combination of resin solvent and resin non-solvent including toluene and Stoddard solvent, the relative proportions of toluene and Stoddard solvent being such that the resin will coagulate upon evaporation of at least a portion of the toluene component.

5. The method of claim 1 wherein the coating material comprises polystyrene resin, toluene, and Stoddard solvent, the relative proportions of toluene and Stoddard solvent being such that the resin will coagulate upon evaporation of at least a portion of the toluene component.

6. The method of claim 2 wherein the coating material comprises polystyrene resin, toluene, and Stoddard solvent, the relative proportions of toluene and Stoddard solvent being such that the resin will coagulate upon a drop in temperature of the mixture.

7. The method of claim 2 wherein the coating material comprises polystyrene resin, toluene, Stoddard solvent, and xylene, the relative proportions of toluene, xylene and Stoddard solvent being such that the resin will coagulate upon a drop in temperature of the mixture.

8. The method of claim 2 wherein the coating material comprises a vinyl resin and a mixture of ketone and Stoddard solvents, the relative proportions of the solvents being such that the resin coagulates upon a drop in temperature of the mixture.

PAUL EBAUGH.

REFERENCES CITED

The following references are of record in the file of this patent:

UNITED STATES PATENTS

| Number | Name | Date |
| --- | --- | --- |
| 378,411 | Block A. P. C. | Apr. 20, 1943 |
| 1,792,102 | Lawson | Feb. 10, 1931 |
| 1,862,565 | Burke et al. | June 14, 1932 |
| 1,997,337 | Malm et al. | Apr. 9, 1935 |
| 2,133,238 | Slayter | Oct. 11, 1938 |
| 2,142,668 | Bucy | Jan. 3, 1939 |
| 2,148,381 | Slauter et al. | Feb. 21, 1939 |
| 2,209,850 | Shand | July 30, 1940 |
| 2,224,274 | Powers | Dec. 10, 1940 |
| 2,234,986 | Slayter | Mar. 18, 1941 |
| 2,319,051 | Fordyce et al. | May 11, 1943 |